(12) United States Patent
Persson (10) Patent No.: US 6,317,125 B1
(45) Date of Patent: Nov. 13, 2001

(54) SAXS VIDEO OBJECT GENERATION ENGINE

(75) Inventor: Michael Meincke Persson, Los Angeles, CA (US)

(73) Assignee: Interplay Entertainment Corp., Irvine, CA (US)

(*) Notice: Subject to any disclaimer, the term of this patent is extended or adjusted under 35 U.S.C. 154(b) by 0 days.

(21) Appl. No.: 09/213,092

(22) Filed: Dec. 15, 1998

Related U.S. Application Data (60) Provisional application No. 60/089,944, filed on Jun. 19, 1998.

(51) Int. Cl.7 .................................................. G06T 17/00
(52) U.S. Cl. ........................................ 345/423; 345/473
(58) Field of Search ................................... 345/418, 419, 345/473, 474, 475, 423

(56) References Cited

U.S. PATENT DOCUMENTS

| | | |
|---|---|---|
| 4,821,214 | 4/1989 | Sederberg . |
| 4,930,091 | 5/1990 | Schroeder et al. . |
| 4,930,092 | 5/1990 | Reilly . |
| 5,261,029 | 11/1993 | Abi-Ezzi et al. . |
| 5,428,718 | 6/1995 | Peterson et al. . |
| 5,506,785 | 4/1996 | Blank et al. . |
| 5,522,022 * | 5/1996 | Rao et al. ............................ 345/440 |
| 5,550,960 | 8/1996 | Shirman et al. . |
| 5,566,281 | 10/1996 | Tokumasu et al. . |
| 5,611,036 | 3/1997 | Berend et al. . |
| 5,611,037 | 3/1997 | Hayashi . |
| 5,615,319 | 3/1997 | Metzger et al. . |
| 5,831,633 * | 11/1998 | Van Roy ............................. 345/441 |
| 6,118,459 * | 9/2000 | Hunter ................................. 345/474 |

OTHER PUBLICATIONS http://www.gds.harvard.edu/ malcolm/DDM/DDM10.html, *Digital Design Media, Chapter 10: Surfaces and Renderings*, pp. 1–19.

* cited by examiner

Primary Examiner—Cliff N. Vo
(74) Attorney, Agent, or Firm—Oppenheimer, Wolff & Donnelly, LLP (57) ABSTRACT

A video object generation method (100) for converting a model (102) such that a tessellation operation (164) can create a realistic character in real time during game play. A shelling and slicing operation (106) produces data strings (140) describing a plurality of slices (110) of the model (102). An assign body parts and edit strings operation (130) places cuts (134) on the model (102) and an apply influences operation (144) establishes the influence on each of a plurality of points (142) from a plurality of bones (148) of a skeleton (146). In real time operations (162) a tessellation operation (164) creates a triangle mesh (165) appropriate to the position and importance of the character in game space, and a properly bent character is displayed in a display operation (168).

22 Claims, 4 Drawing Sheets

SAXS VIDEO OBJECT GENERATION ENGINE

RELATED APPLICATION

This application claims priority to U.S. Provisional Application No. 60/089,944 filed Jun. 19, 1998.

Portions of this patent application contain materials that are subject to copyright protection. The copyright owner has no objection to the facsimile reproduction of the patent document or the patent disclosure as it appears in the Patent and Trademark Office patent file or records. Nevertheless, the copyright owner otherwise reserves all copyright rights whatsoever.

TECHNICAL FIELD

The present invention relates to the field of computerized video graphic figure generation and more specifically to a system which generates figures on a computer screen with a high degree of realism and without overburdening the computer processor. The predominant current usage of the present inventive video object generation engine is computerized video games and other computer graphic displays wherein it is desirable to generate figures and objects which move in a lifelike manner without slowing down the operation of the game or display.

BACKGROUND ART

Drawing pictures on the screen during the playing of a video game is a highly math intensive procedure which can potentially overburden even the best and fastest processors on the market today. Generally, the more animated objects that are on a game screen, the more the game action tends to slow down as processors strive to perform the necessary calculations. Indeed, many manufacturers have given up on the idea of solving this problem by software methods and are providing games which require advanced video chipsets and/or advanced processors in order to perform the necessary calculations.

Conventionally, characters are stored as a plurality of connected polygons. This places certain restrictions on their use. For example, since the resolution of the character is set by the relative size and quantity of such polygons, the resolution can be optimized only for a particular view. For example, a character that looks fine at a distance can be quite unacceptable close up in that the polygon structure will be too course with the individual polygons being distractingly noticeable. This problem can be partially alleviated by storing several versions of a character, each to be used at an appropriate distance, but this is not an ideal solution. Firstly, storing several versions of a character takes up much needed memory, and secondly there may be a noticeable jump while the character is moving in and out of the screen as the version is switched.

Another of the problems associated with the prior art methods is that realistic movement of characters is not possible, since the form of the individual polygons is fixed.

It would be advantageous to have a method for solving these and other related problems, and for reducing the number of calculations required in real time and/or for adapting the quantity of calculations required as the need arises. To the inventor's knowledge, no such method has existed in the prior art. The fact that game producers have voluntarily limited their markets by making their games playable only on machines equipped in a particular manner strongly indicates that it has, heretofore, been thought that games and other graphic displays having a great quantity of real time generated animation inevitably require an onerous quantity of real time calculations.

DISCLOSURE OF INVENTION

Accordingly, it is an object of the present invention to provide a video engine which will generate animated figures, such as representations of human figures, which are realistic in appearance and movement.

It is still another object of the present invention to provide a video engine which will generate animated figures using a minimum of real time calculations.

It is yet another object of the present invention to provide a video engine which is adaptable for use with different types and speeds of processors while obtaining the maximum performance from each.

It is still another object of the present invention to provide a video engine which will produce a detailed and realistic display without slowing down the action in the game.

Briefly, the preferred embodiment of the present invention is a method and apparatus embodied in software which will analyze the characteristics of a conventional figure model and store the information necessary to reproduce the model in real time as a game is played. Analysis is accomplished by slicing the model into a large number of slices, and determining a plurality of points on the perimeter of each slice. Certain of these points will be designated as anchor points and stored with information relating to the characteristics of related surface areas and associations to other such points on adjacent slices. Also, information is stored relating to the influence of character bone structure to the surface areas. Thereby, realistic movement can be accomplished and resolution can be idealized as the character is effectively rendered in real time.

An advantage of the present invention is that characters can have a resolution commensurate with their importance and position in the game space.

A further advantage of the present invention is that more moving characters can be produced in a screen without slowing down the operation of a game.

Yet another advantage of the present invention is that characters move in a realistic manner.

Still another advantage of the present invention is that games run faster and with a more visually pleasing appearance.

These and other objects and advantages of the present invention will become clear to those skilled in the art in view of the description of the mode of carrying out the invention described herein and the industrial applicability of the preferred embodiment as described herein and as illustrated in the several figures of the drawing.

BEST MODE FOR CARRYING OUT INVENTION

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the present invention with appropriate standard computer hardware to execute the code contained therein. An apparatus for practicing the invention could be one or more computers and storage systems containing or having network access to computer program(s) coded in accordance with the invention, and each of the operations of the invention is a subroutine of the inventive program method.

Figure 1:
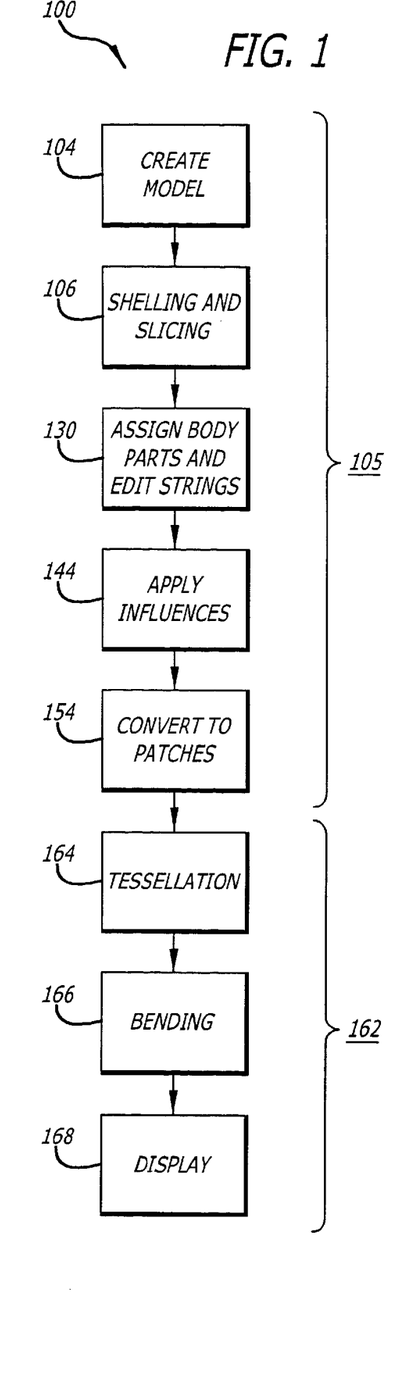
FIG. 1 is a high level flow chart depicting an example of the present inventive method.

The best presently known mode for carrying out the invention is a character generation and production engine known as the SAXS video object generation engine. The inventive video object generation engine is depicted in a high level flow chart in the view in FIG. 1 and is designated therein by the general reference character 100. The high level flow chart of FIG. 1 represents the major operations of the present inventive video object generation method 100. In a create model operation 104, a "model" of a figure is created, in the present example, using conventional methods. While the model may be created in many different ways, a typical method would be to use the commercially available Autodesk 3D Studio™ program. In any event, the model, in fact, will be a file which, in the example of this embodiment, will be in the format used by 3D Studio™. One skilled in the art will recognize that the input file format (3D Studio™ release 4) has data pertaining to the triangles which make up the polygon mesh to create a model, and the mapping information pertaining to the light and rendering settings and detail resolution for the rendered model. In the embodiment described, the file format is converted to a different format in order to make the files device independent, before beginning the operations described hereinafter, but this is not necessary to the practice of the invention. The information contained within the reformatted files is not changed. Briefly, the files contain a vertex list, a face list, texture coordinates and a materials list.

Figure 2:
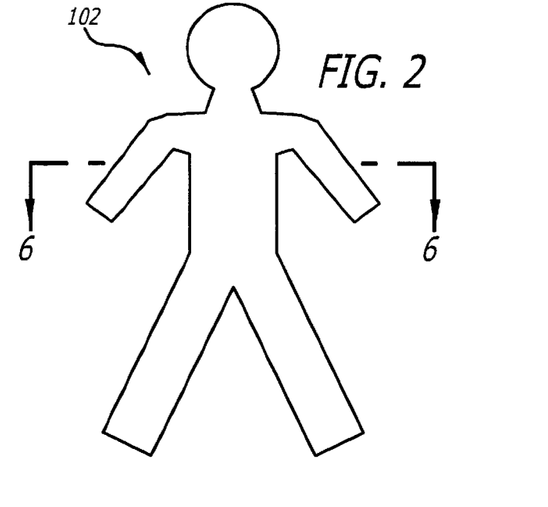
FIG. 2 is a graphical rendering of a model file upon which the present inventive method is to be performed.

In order to assist in the understanding of the invention, FIG. 2 depicts a model 102 which, for purposes of this example, is generally in the shape of a human figure. It should be remembered that the model 102 as depicted in the view of FIG. 3 is a graphical rendering of a file such as will be operated upon in the operations described hereinafter.

A shelling and slicing operation 106 is the first step of a general character creation process 106. FIG. 3 is a more detailed flow chart of the shelling and slicing operation 104 of FIG. 1. The model 102 (FIG. 1) is divided into a plurality (600 in this present example) of slices 110 as depicted in FIG. 4. FIG. 4 is a top plan view of the slice 110 of the model 102 taken along line 6—6 of FIG. 2. One skilled in the art will recognize that the data needed to obtain the slice 110 is inherent in the model 102 and can be readily segregated for purposes of the presently described operations. The actual quantity of slices is determined from the general mesh resolution specified in a script file (the overall resolution in which the operation is being performed) and from an optional resolution value assigned per face in the 3D Studio™ file. The quantity of slices may be visually determined to be the best compromise such that the object will have sufficiently great resolution and yet will require a minimal amount of data to be stored. In this example, the determination of the quantity of such slices is height based. For example, a six foot high figure will typically be divided into 400 slices. Generally, a minimum of 250 slices is required even for smaller figures. If insufficient slices are used, the system will not be able to generate the shape desired. In practice, it is expected that a large number of slices will be used, within the capabilities of the computer system being used at this stage of the operation. If a lower "resolution" is acceptable, then the data can optionally be "scaled down" at a later stage in the development of the object.

Figure 3:
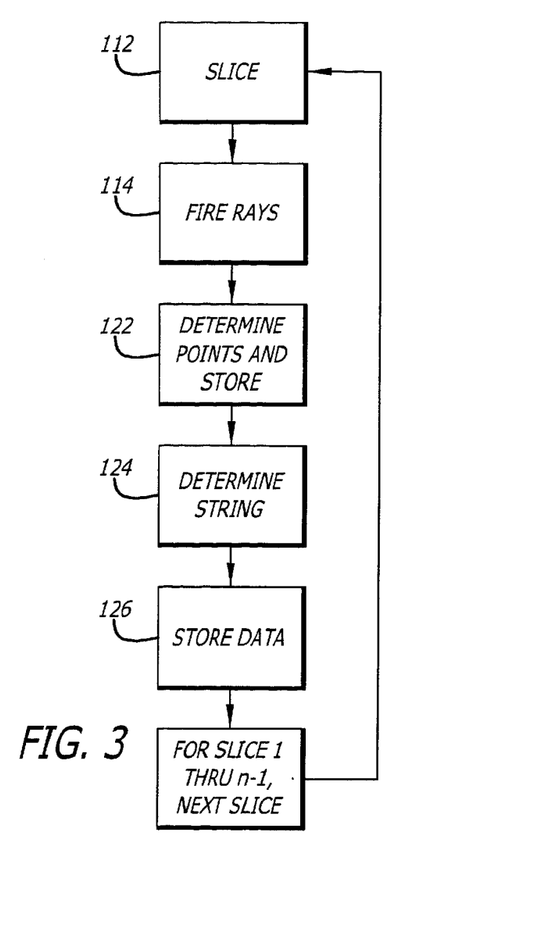
FIG. 3 is a more detailed flow chart of the shelling and slicing operation of FIG. 1.
Figure 4:
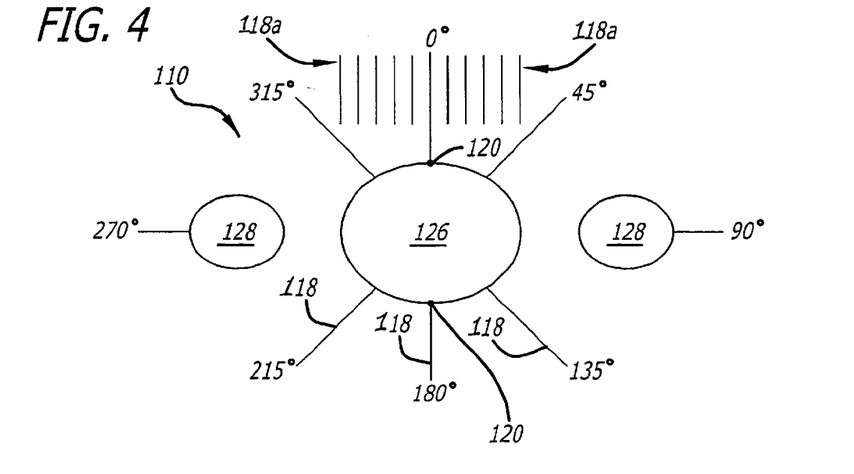
FIG. 4 is a slice of the model of FIG. 3 taken along line 6—6 of FIG. 2.

Referring again to the flow chart of FIG. 3, a slice operation 112 represents the segregation of data to produce the slice(s) 110 (FIG. 4) from the model (FIG. 2). The slice(s) 110 are rendered individually from a predetermined number of angles (4 in this present example: front, side, left quarter view and right quarter view). Each slice 110 is examined from each angle as described hereinafter.

In a fire rays operation 114 a plurality of rays 118 (FIG. 4) are fired from each of 8 directions (nominally 0°, 45°, 90°, 135°, 180°, 225°, 270° and 315°). In this example, the quantity of rays 118 fired from each of the directions is 500. One example of this is shown in the example of FIG. 4 in the form of example parallel rays 118a emanating in parallel fashion from the 0° angle. Of course, in the example of FIG. 4 only a few of the total of 500 parallel rays 118a which emanate from the 0° angle are shown in order not to obscure the entire example. All "hits" (intersection of the rays 118 with the slice 110) are recorded and information is kept relating to all such intersections in a determine points and store operation 122. This information is the color, normal vector, position, object number and face number of such outside points 120. All of the hits from the rays 118 are then examined for overlapping (to determine if the hit is on the outside edge of the model 102, or on an interior surface which will not be seen from any angle). The routine looks at closeness between two hits and their normal vector. If two hits are very close (determined by the rendering resolution)

and the angle between them is between a determined threshold, it can be determined that a point is obstructed by another point and the hidden point is then removed.

After all this, the intersections of the rays 218 and the slice 110 which are left are outside points 120. These next have to be connected into ordered strings to define the slice 110. This is done in a determine strings operation 124. In the determine strings operation 124 a first point in the string is picked. The program looks left and right and tries to find a neighbor point. It looks for proximity, curvature, same face, normal vector, and UV closeness.

If the program determines that two points are connected it connects them to a string and tries to fit more points to a string. When it can't find any more points for that string, it moves on and tries to create new strings. When all points in the slice have been accounted for it tries once again to connect the already done rings. After it is done it moves on to the next slice. As can be appreciated in light of the view of FIG. 4, a torso 126 and two arms 128 are represented. Therefore, ideally all of the outside points 120 defining the torso 126 will be recognized as belonging to a string, and outside points 120 relating to each of the arms 128 will each form a separate string. The results for the strings are then saved in a store data operation 126 and this process is repeated for each slice 110 of the model 102 (FIG. 2).

More specifically the criteria used, in the embodiment of the invention described herein, the decision criteria for connecting data into the strings 140 and removing inner points in the model 102 is as follows, although it must be noted that it is within the scope of the invention that alternate criteria might be used in different applications of the invention: Firstly, it should be noted that, as discussed above, the program keeps track of all points 142, and the program also keeps track of which ray 118 "saw" each point 142 and also where on the ray 118 each point 142 was found. This information is referred to herein as a rayhit sequence. Following each rayhit sequence of the points 142, the program keeps the first and last hits (points 142) from each ray 118, since it is known that they are on the outside of the model 102. Then, a point 142 is deleted if the distance between the next hit point 142 and current point 142 is less than the unit resolution (the number that determines the final resolution of the model 142—also known as the voxelsize).

Next, if the dot product of a next point 142 and the current point 142 (which can be calculated since vector quantities of lines culminating in the points is part of the model file) is less than the cosine of 45 degrees, then the next point 142 is deemed to be just another layer of clothing, since it is behind the current (good) point 142 and is facing in the same direction. Hence, it must be obstructed by the current point 142. This is a "rough" method for getting rid of most "inner" points 142.

To connect the points 142 into the string 140, a list is made of neighboring points 142 on a slice 110 (referred to herein as "neighborpoints"), and a search radius unit size ("searchradius") is selected. In this example the searchradius is selected to be 3, since that size will close some of the smaller gaps but won't start connecting things that are clearly not connected. However, it should be recognized that decisions regarding such criteria will largely be trial and error determined by the visual results achieved, and users of the invention will be free to choose and alter such criteria, as necessary or desired.

The list of neighborpoints is then sorted for closeness, and all neighborpoints are evaluated until a match is found, and then evaluation of the neighborpoints begins again until no more matches are found. In order to find a match, the following criteria are used, in this present example. First, the following three values are calculated for each new neighborpoint: Val1 is the dot product of the current point 142 and the next neighborpoint. If the dot product is greater than cosine 30, then val1=true.

Val2 is set at, if both points 142 (current and next) belong to same face then val2=true. Val3 is set as follows: If the string 140 already has 2 points, then find 2d UV distance between the last two points 142 on the string 140 and new point 142 and last point 142. If that distance does not vary more than 25%, then Val3=true.

Then a decision is made based upon an assigned weight of the above values. In this example, the weight assigned to the values is as follows: Val1=50%; Val2=25%; AND Val3=25%. These weightings, as well as the threshold criteria discussed hereinafter, are presented herein by way of example only.

Finally, in this example of the subprocesses described, if the cumulative weight of Val1, Val2, and Val3 is greater than 50%, then the new point 142 is connected to the string 140, and the process is repeated. After this process is done all single points 142 in a string 140 (points that couldn't connect to anything) are deleted since they apparently didn't contribute to the model 142.

Figure 5:
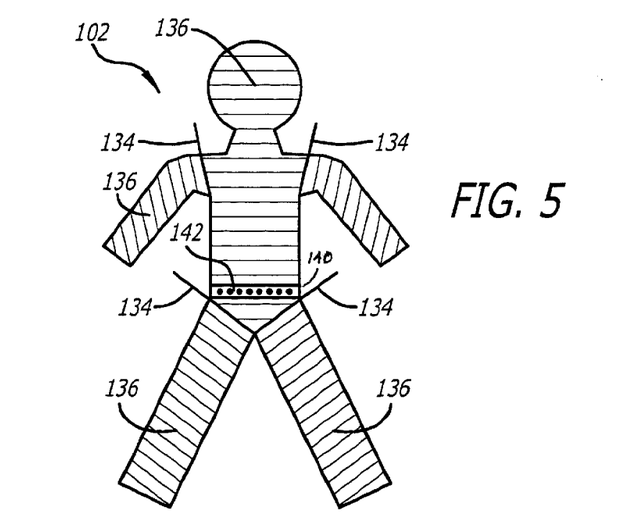
FIG. 5 is a graphical representation of the model of FIG. 2 showing slices and points therein.
Figure 6:
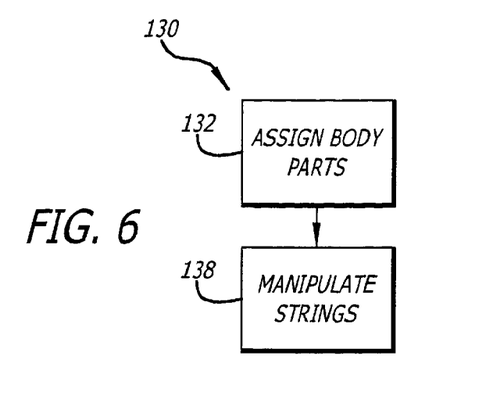
FIG. 6 is a more detailed flow chart of the assign body parts operation of FIG. 1.

Referring again to FIG. 1, in an assign body parts and edit strings operation 130, further preparation of the character is accomplished as follows: FIG. 5 is a graphical representation of the model 102 of FIG. 2 showing the slices 110 therein, as accomplished in the slice operation 112 (FIG. 3) discussed previously herein. (Again, in order to better illustrate the invention, the resolution of the slices 110 depicted in this example is much less than that previously discussed.) FIG. 6 is a more detailed flow chart showing operations within the assign body parts and edit strings operation 130 of FIG. 1. In an assign body parts operation 132 a user views the graphical representation of the model 102 as shown in FIG. 5 and, using a mouse, places cuts 134 to separate the body parts 136 (for example, arms, legs, head, torso) such that each body part 136 may be treated separately in subsequent operations, as desired. Each body part 136 is assigned an X and Y priority for subsequent display of the model 102. As will be discussed in more detail hereinafter, this priority will dictate how many parametric surfaces, which define the shape of a surface, will be generated on each of an X and Y axis 137. Note that, although the cuts 134 are shown in the view of FIG. 5 as generally straight lines, in actual practice, points which are common to both body parts 136 (an arm and a torso, for example) will be identified and designated as "patch points". These patch points will always be kept alive so as to avoid holes between such body parts.

In a manipulate strings operation 138, the user is provided with the opportunity to manipulate strings. A plurality of strings 140 is depicted in the view of FIG. 5, each as an ordered plurality of points 142 within each slice 110. By manipulating the positions of points 142 within the strings 140 the user has the opportunity to connect them manually, move them around, delete confusing entries and repair holes.

Figure 7:
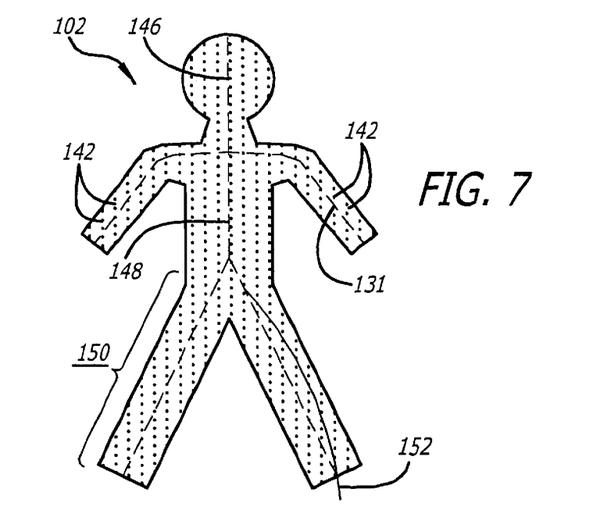
FIG. 7 is a graphical representation of the model of FIG. 1 showing points and skeleton therein

Referring again to FIG. 1, an apply influences operation 144 is next accomplished. FIG. 7 is a view of the model 102 showing the points 142 as discussed previously in relation to FIG. 5. A skeleton 146 having individual bones 148 is applied within the model 102. The skeleton 146 will be familiar to those skilled in the art of games animation and can be produced by any of a number of methods, conventional or non-conventional. A sample animation program is also loaded so that the user can watch sample movement of the model 102. One skilled in the art will recognize that there are various ways of developing the skeleton 146 and related movement thereof. For example, the skeleton 146 can be drawn by an animator, or can be produced using a computer such that movement of a live actor is traced and articulation points are associated with ends of the bones 148.

According to the presently described embodiment of the invention, an influence number is associated with each point 142 relating to each bone 148 such that a point on the (yet to be created) surface of the model 102 will show varying influence from the movement of one or several of the bones 148. In this embodiment, an airbrush-like tool is used to spray the influence from each bone 148 on the model 102. While this is being done it can be seen, in realtime, how the animation of the model 102 now reacts to such modifications. For an knee, for example, an example of a bending area 150 is defined as fading between 100% influence from the upper leg and 100% influence from the lower leg. Accordingly, on the tip of the elbow, the point's position is determined as 50% upper rotation and 50% lower rotation. For the buttock area, for example, this process is vital as it enables the artist to simulate underlying muscle. Because results can all be seen by the artist (user) in real-time the artist can bend the leg, see the result and spray on new influence and see the model 102 change accordingly.

A projection path 152 is the path that projected parametric surfaces will follow. It can most easily be understood by thinking about it as having a long cylinder and bending it to fit the specified projection path 152. After bending the cylinder, the sides are then pushed in and out to approximate the surface of the body part it is trying to fit. Each body part 136 is fitted with a projection path 152. A spline is inserted into the core of each body part 136 and is bent to follow twists that the body part 136 might have. This step is desirable for generating clean data that is usable for the tessellation described hereinafter. While automated fitting of the projection path 152 is being developed it is, thus far, less than completely automated. For tentacles (as of an octopus), for example, it is necessary to manually input the specifics of the projection path 152.

Figure 8:
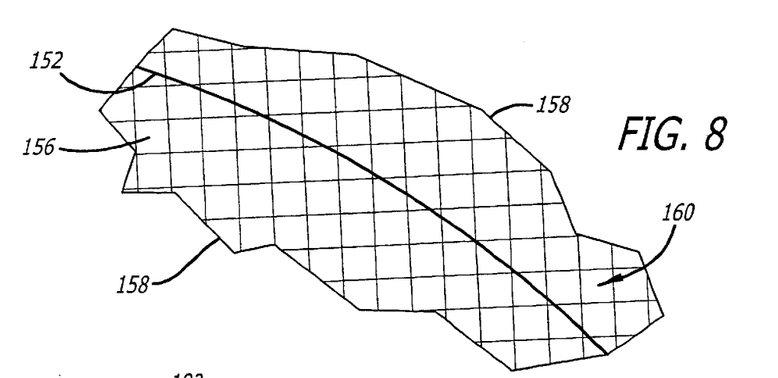
FIG. 8 is a graphical representation of a body part showing the creation of a patch model thereon.

In a convert to patches operation 154 the connected strings of data which are divided into the isolated horizontal slices 110 previously described herein are used to create unified textured parametric surfaces between anchor points in neighboring slices 110. FIG. 8 is a diagrammatic representation of a body part 136 (such as a part of an arm) which will be used to illustrate the following example. Taking one body part 136 at a time, each of the body parts 136 is turned into mapped patch surfaces 156. Following the projection path 152 and its angle, the body part 136 is projected onto a patch cylinder 158. The number of segments (patches 156) on x and y is determined by the x and y priorities assigned in the prior section. A patch model 160 is fitted to follow the surface of the body part 136 as closely as the x and y priorities allow it. Afterwards, the mapping from the strings 140 of data is projected outwards onto the fitted patch cylinder. This process generates uniform maps for the cylinder 158. The maps can also optionally be loaded in a paint program, for example, for each body part 136 individually and manipulated therein to obtain the exact look desired. This allows for manually scaling maps to higher resolution than the model 102 initially provided.

It should be noted that, the cuts 134 of the present invention are used to make a clean separation between body parts 136. The cuts 134 are used to define a common connection area between the two cylinders 158, thereby avoiding cracks when the cylinder 158 resolution changes. It is used to remove inner points between neck and torso for example, so the hidden area where the two cylinders 158 connect is not rendered. It is used for cutting parts in half that will potentially be "amputated" in the game.

Figure 9:
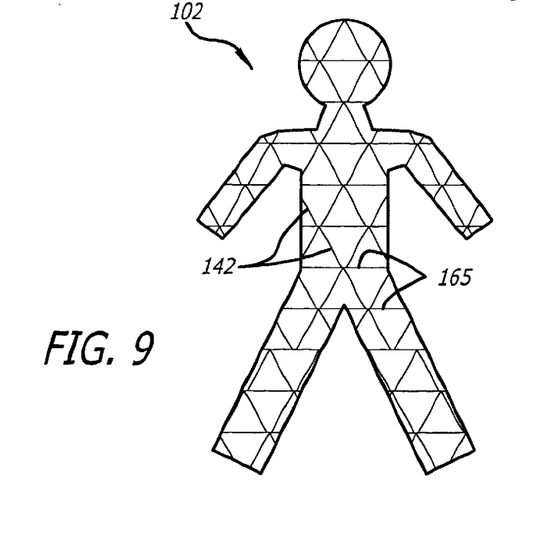
FIG. 9 is a graphical representation of a model showing a triangle mesh created thereon.

Returning again to FIG. 1 and now beginning a discussion of real time operations 162, in a tessellation operation 164, the patch model 160 and variables for determining what quality a final model should be in are used to produce a traditional triangle mesh 165 (illustrated on the model 102 in FIG. 9) with mapping information obtained from anchor points. This operation enables dynamic representations of the model 102 depending on processor speed, size of screen and subjective importance for the game. Because of run time processing restrictions this subroutine should be designed to be very efficient. This is not difficult since most of the calculations have been done in the previous sections.

In specifying the x and y resolution, a 1.0 means that all anchorpoints are being used as straight connection points for polygons. Because these points define a curve, additional points can be generated between the anchor points, thereby generating additional surface information. For example, a perfect circle can be described as four points in a square formation while points therebetween are generated on the perimeter of the circle by equation, as discussed hereinafter. The patch model 136 is stored with each slice 110 having connections to the slice 110 directly under it. All points on a slice 110 (FIG. 1) which make up the points of the triangle mesh 165 are stored along with relative angle data such that it can be determined which points connect to other points on an adjacent slice 110. Additional points can be generated, as desired, to more fully define the model 102 and, similarly, unnecessary points can be removed from the slices 110 to reduce the quantity of polygons.

The routine can be set in two modes, as follows:

1. Only use anchor points for display:

This mode only allows the routine to pick points 142 that are anchor points and eliminating any spline calculations in real time. For example, if there are 16 anchor points in one slice and 20 slices in the body part, an xy resolution of 3.5 would produce the following points: Notice the this example contains unequal incremental steps. Usually this is not noticeable, but it is not a perfect solution. Each point is saved and its bending properties, UV coordinates, texture number and connections remembered.

x00,y00,x03y00,x07y00,x10y00,x14y00,x16y00 x00,y03,x03y03,x07y03,x10y03,x14y03,x16y03 x00,y07,x03y07,x07y07,x10y07,x14y07,x16y07

2. Generate new information using the spline patch properties and the resolutions specified:

This mode will allow for the routine to generate new points in between existing anchor points. Using normal spline math new points are generated for the xy resolution 3.5, 3.5 as follows:

x00,y00,x03.5y00,x07y00,x10.5y00,x14y00,x17.5y00 x00,y3.5,x03.5y3.5,x07y3.5,x10.5y3.5,x14y3.5, x17.5y3.5 x00,y07,x03.5y07,x07y07,x10.5y07,x14y07,x17.5y07

This method is slower, but more exact. As before, the points are stored with all their properties, ready for bending.

Following the tessellation operation 164 is a bending operation 166. In the bending operation 166, the triangle mesh 165 generated in the tessellation operation 164, bone 148 influences previously discussed herein, information relating to triangle/anchor correlation, and skeleton information will be used to move the traditional triangle 165 mesh into desired positions. In the described embodiment, each point 142 can have a maximum of three bones 148 (FIG. 7) influencing it. The skeleton 146 has been rotated in advance (by a game program, or the like). One familiar with the manipulation of such objects will recognize that the skeleton 146 data can contain information about how the skeleton 146 rotates and/or moves. If, for example, a point 142 has 30% bone 2 and 70% bone 3, that point is rotated with the bone 2 and the bone 3 matrices and the results are weighted 30/70. The resulting point 142 is now in its final position. Repeat that for all points found in the tessellation and you have the finished, bent model.

In a display operation 168 the triangle mesh 165 is rotated to fit the camera view. For each vertex a light value is calculated according to the normal vector computed in the tessellation 164 operation and the specified light positions. Each triangle is then drawn individually using the UV coordinates and textures passed on from the tessellation 164 operation using either software routines or, alternatively, utilizing a dedicated hardware device.

Figure 10:
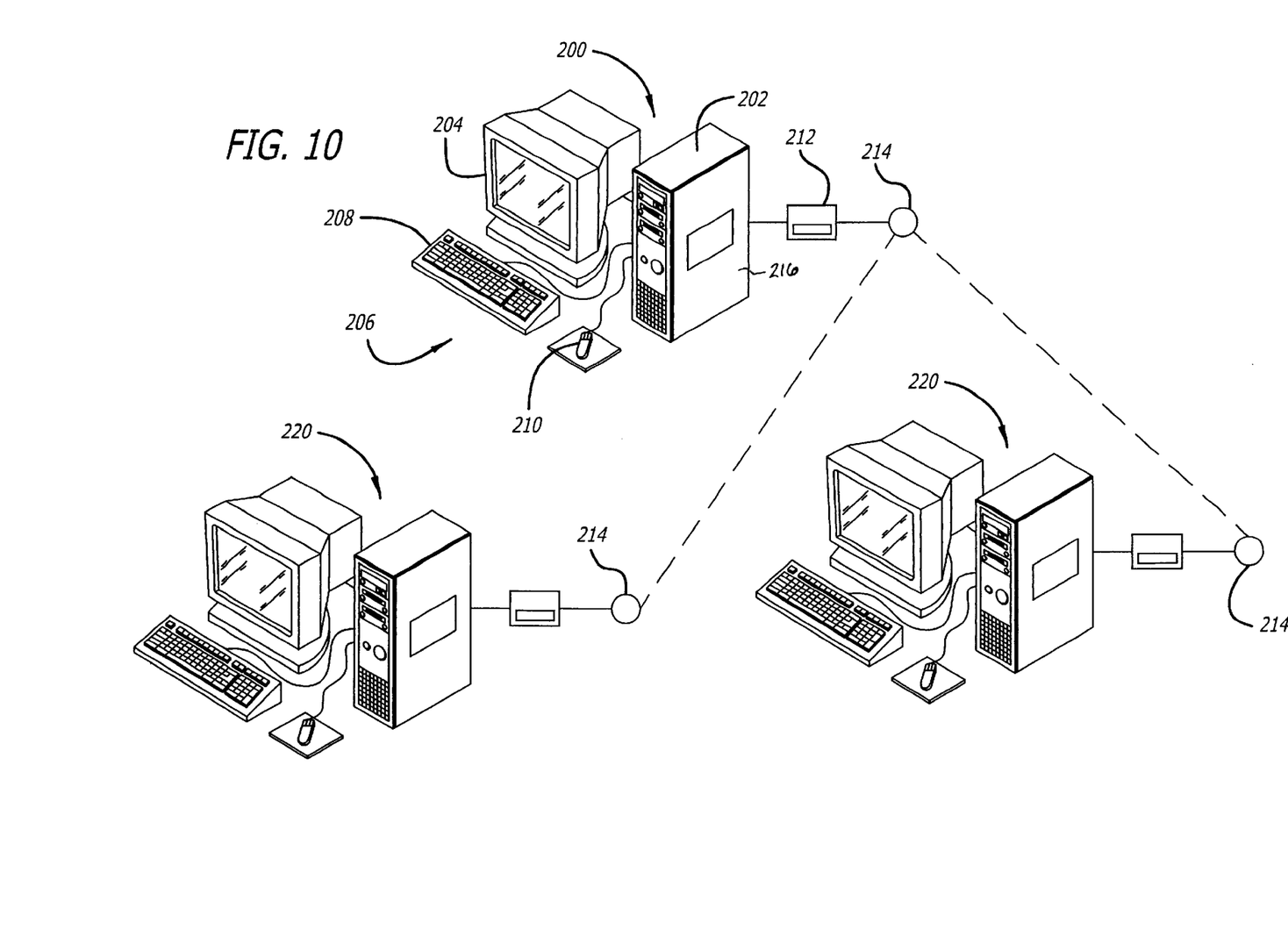
FIG. 10 is a diagrammatic view of a computer system such as can be used in conjunction with the present invention.

FIG. 10 depicts a typical computer system 200 such as will typically be used in conjunction with the present invention. The computer system will, typically, have a computer 202, a monitor 204 and one or more input devices 206 such as a keyboard 208 and a mouse 210 as depicted in the example of FIG. 10. A removable media drive 212 will accept a removable media 216 for inputting programs and data into the computer 202. The computer 202 will also generally be equipped with a fixed disk drive 214 for storage of programs and data thereon. It should be understood that the elements of the computer system which are shown in FIG. 10 and described in relation thereto are not intended to depict a complete computer system. Rather, FIG. 10 is intended only to set the context for the following description of the invention. Similarly, while the present invention will frequently be used in the context of the computer system 200, the scope of the invention is not limited to use in such a system. Indeed, it is anticipated that the present invention will frequently be used in conjunction with dedicated systems, such as video game systems, which will not require all of the appurtenances described in relation to this present example.

It is further intended, as depicted in the view of FIG. 10 that, although the entire inventive method can, and in some cases will, be performed on the computer system 200, the removable media 214 containing code including the characters generated according to the present inventive method will be distributed to user computers 220 such that the real time operations 162 can be accomplished by the computers of end user consumers.

Various modifications may be made to the invention without altering its value or scope. All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The inventive SAXS video object generation engine 100 is intended to be widely used for creating and real time rendering of characters in video games and other types of video applications wherein such manipulation of visually perceptible characters is desired.

The SAXS character system described herein represents a leap in the technology used in multimedia. it bridges technologies and techniques used in modeling on high end rendering stations to be used with consumer grade PCs and commercially available 32-bit game consoles, as well as with other systems presently existing or yet to be developed.

Changing from the traditional triangle mesh to a shape based approach removes many of the limitations traditionally faced by makers of video games. One character can be modeled and used for any platform, fast or slow. The system is completely adaptive and eliminates the need for separate high resolution models for opening sequences and low resolution models for ingame purposes. Furthermore, it solves the dilemma caused by wanting to have many characters on screen at the same time while not having the possibility to concentrate the computational power on the characters closest to the camera while downgrading (in importance) characters of lesser importance and/or at greater distances. This system provides all of the above advantages with no considerable overhead in terms of storage space and/or processing time.

During the real time operations 162, the inventive video object generation method 100 will generally generate points 142 according to priorities. The computer 202 will have to generate strips of polygons (triangle mesh 165) including these points 142.

In some cases compensation for special cases within a slice 110 can be accommodated by assigning a priority to a point 142 such that said point 142 is always used. For example, important extremities such as the nose, eye sockets, tips of breasts, and the like can be assigned to always be used in the construction of the final product. Therefore, according to this embodiment of the invention, there are three levels of priority for points 142. These are: inactive (not used), active (considered for tessellation), and high priority (which means that points 142 assigned this priority will always will be rendered no matter what). Accordingly, a skilled user can reduce the number of polygons which must be generated in order to produce a visually pleasing character from more than 6000 polygons (sometimes many more than 6000) down to 50 without experiencing any artifacts.

Since the SAXS video object generation engine 100 of the present invention may be readily produced and integrated into existing video game production systems and methods, and since the advantages as described herein are provided, it is expected that it will be readily accepted in the industry. For these and other reasons, it is expected that the utility and industrial applicability of the invention will be both significant in scope and long lasting in duration.

What I claim is:

1. A method for creating a visual game character, comprising:

dividing a model into a plurality of subparts;

defining each of said subparts by a series of points;

associating points of each subpart with at least one point of an adjacent subpart; and generating a plurality of polygons between points of adjacent subparts to form the character.

2. The method of claim 1, wherein:

at least some of said points are associated with a bone such that movement of the bone will influence movement of said point.

3. The method of claim 1, wherein:

the at least some of said points move in conjunction with the movement of the bone.

4. The method of claim 2, wherein:

at least some of said points are associated with more than one bone, such that movement of the point will be influenced by the movement of the more than one bone.

5. The method of claim 4, wherein:

the at least some of said points are associated with influence values such that movement of each of the bones will cause said points to move in proportion to the corresponding influence value.

6. A computer program product comprising a computer usable medium having a computer readable code embodied thereon configured to operate on a computer, comprising:

a shelling and slicing subroutine for shelling and slicing a model; and an assign body parts and edit strings subroutine for assigning body parts and editing strings of data.

7. The computer program product of claim 6, wherein:

the strings of data are points which describe at least a portion of a cross section of the model.

8. The computer program product of claim 6, and further including:

an apply influences subroutine, wherein influences are applied to at least a portion of the model.

9. The computer program product of claim 6, and further including:

a convert to patches subroutine.

10. The computer program product of claim 6, and further including:

a tessellation subroutine.

11. The computer program product of claim 6, and further including:

a bending subroutine.

12. The computer program product of claim 6, wherein said shelling and slicing subroutine, includes:

a slice operation for dividing the model into a plurality of slices.

13. The computer program product of claim 6, wherein said shelling and slicing subroutine, includes:

a fire rays subroutine wherein rays are fired across at least a portion of the model.

14. The computer program product of claim 6, wherein said shelling and slicing subroutine, includes:

a determine points subroutine wherein points on at least a portion of a surface of the model are determined.

15. The computer program product of claim 14, wherein said shelling and slicing subroutine, includes:

a determine string operation wherein points are arranged into a string.

16. The computer program product of claim 15, wherein the strings generally form a cross section of an exterior surface of the model.

17. The computer program product of claim 6, wherein said assign body parts and edit strings subroutine, includes:

an assign body parts subroutine; and a manipulate strings subroutine.

18. A computer program product comprising a computer usable medium having a computer readable code embodied thereon configured to operate on a computer, comprising:

a slicing subroutine for dividing a model into a plurality of slices; and a point determining subroutine for determining a plurality of points on each slice.

19. The computer program product of claim 18, and further including:

a patch conversion subroutine for converting data into patches.

20. The computer program product of claim 19, and further including:

a tessellation subroutine for tessellating the patches.

21. The computer program product of claim 19, and further including:

a bending subroutine for bending the model.

22. The computer program product of claim 19, and further including:

displaying the model.

* * * * *